US011627291B2

(12) United States Patent
Greif et al.

(10) Patent No.: US 11,627,291 B2
(45) Date of Patent: Apr. 11, 2023

(54) IMAGE PAINTING WITH MULTI-EMITTER LIGHT SOURCE

(71) Applicant: Meta Platforms Technologies, LLC, Menlo Park, CA (US)

(72) Inventors: Daniel Guenther Greif, Redmond, WA (US); James Laudolff, Issaquah, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 534 days.

(21) Appl. No.: 16/450,271

(22) Filed: Jun. 24, 2019

(65) Prior Publication Data

US 2020/0404228 A1    Dec. 24, 2020

(51) Int. Cl.
*H04N 9/31* (2006.01)
*G02B 26/10* (2006.01)
*G02B 27/30* (2006.01)
*G03B 21/14* (2006.01)

(52) U.S. Cl.
CPC ............ *H04N 9/3129* (2013.01); *G02B 26/10* (2013.01); *G02B 27/30* (2013.01); *G03B 21/142* (2013.01)

(58) Field of Classification Search
CPC ...... H04N 9/3129; G02B 26/10; G02B 27/30; G02B 26/0833; G02B 26/101; G02B 27/0081; G02B 26/123; G03B 21/142
See application file for complete search history.

(56) References Cited

U.S. PATENT DOCUMENTS

| 9,818,009 B2 * | 11/2017 | Jungwirth | .......... G02B 27/1013 |
| 10,038,840 B2 | 7/2018 | Vallius | |
| 2017/0034435 A1 * | 2/2017 | Vallius | ............... H04N 5/23293 |
| 2018/0255278 A1 * | 9/2018 | Tardif | ................ G02B 27/0093 |

OTHER PUBLICATIONS

PCT/US2020/034341 Search Report dated Sep. 8, 2020.

* cited by examiner

*Primary Examiner* — Michael E Teitelbaum
(74) *Attorney, Agent, or Firm* — Pequignot + Myers; Matthew A. Pequignot

(57) ABSTRACT

A scanning projector display includes a light engine comprising N emitters coupled to a collimator for providing a fan of N light beams of variable optical power levels, where N>1. The N emitters are spaced apart from each other such that pixels of the image simultaneously energized by neighboring ones of the N emitters are non-adjacent. A scanner receives and angularly scans the fan of N light beams about first and second non-parallel axes to provide an image in angular domain. A controller coupled to the scanner and the light engine causes the scanner to simultaneously scan the fan of N light beams about the first and second axes, and cause the light engine to vary the optical power levels of the N emitters with time delays such that adjacent pixels of the image are energized by different ones of the N emitters.

20 Claims, 15 Drawing Sheets

IMAGE PAINTING WITH MULTI-EMITTER LIGHT SOURCE

TECHNICAL FIELD

The present disclosure relates to wearable headsets, and in particular to scanning projector displays and methods therefor.

BACKGROUND

Head mounted displays (HMD), helmet mounted displays, near-eye displays (NED), and the like are being used increasingly for displaying virtual reality (VR) content, augmented reality (AR) content, mixed reality (MR) content, and they are finding applications in diverse fields including entertainment, education, training and biomedical science, to name just a few examples. The VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted display. Because a display of HMD or NED is usually worn on the head of a user, a large, bulky, unbalanced, and/or heavy display device would be cumbersome and may be uncomfortable for the user to wear.

Scanning projector displays provide images in angular domain, which can be observed by an eye directly, without an intermediate screen or a display panel. The lack of a screen or a display panel in a scanning projector display enables size and weight reduction of the display. A miniature scanning projector display requires a compact and efficient light source, as well as a fast scanner for scanning optical beams emitted by such a light source over a field of view (FOV) of the scanning projector display.

SUMMARY

In accordance with the present disclosure, there is provided a scanning projector display comprising a light engine having N emitters coupled to a collimator for providing a fan of N light beams of variable optical power levels, where N>1. A scanner is configured to receive and angularly scan the fan of N light beams about first and second non-parallel axes to provide an image in angular domain. The N emitters are spaced apart from each other such that pixels of the image concurrently energized by neighboring ones of the N emitters are non-adjacent. A controller is operably coupled to the light engine and the scanner and configured to cause the scanner to concurrently scan the fan of N light beams about the first and second axes, and cause the light engine to vary the optical power levels of the N emitters with time delays such that adjacent pixels of the image are energized by different ones of the N emitters.

The N emitters may be spaced apart such that a spacing between the concurrently energized pixels is at least one of Nm−1, Nm, or Nm+1, where m is an integer. The scanner may be configured to continuously scan the fan of N light beams about the first axis at a frame rate while continuously scanning the fan of N light beams about the second axis at a line rate higher than the frame rate. In embodiments where the image comprises first and second interlaced portions of image pixels, the controller may be configured to operate the light engine to energize the first portion of the image pixels during a first scanning cycle about the first axis, and to energize the second portion of the image pixels during a subsequent second scanning cycle about the first axis.

In some embodiments, the fan of N light beams has an angular width defined along a direction of scanning about the first axis, and the controller is configured to operate the scanner for bidirectional scanning the fan of N light beams about the second axis and for operating the N emitters during first and second opposed directions of the bidirectional scanning about the second axis. The controller may be further configured to operate the scanner for unidirectional scanning the fan of N light beams about the first axis such that the fan of N light beams is scanned about the first axis by one angular width per each bidirectional scan about the second axis. The controller may be also configured to operate the scanner for bidirectional scanning of the fan of N light beams about the first axis such that the fan of N light beams is scanned about the first axis by two angular widths per each bidirectional scan about the second axis.

In some embodiments, the controller is configured to display a first image frame during a first scanning cycle about the first axis, and a next image frame during a next scanning cycle about the first axis. During the first scanning cycle, scanning trajectories of the fan of N light beams corresponding to the first and second directions of the bidirectional scanning intersect one another at a first grid of intersection points. During the next scanning cycle, scanning trajectories of the fan of N light beams corresponding to the first and second directions of the bidirectional scanning intersect one another at a second grid of intersection points. The controller may be configured to delay the scanning about the second axis relative to scanning about the first axis such that the first and second grids of intersection points are offset relative to each other by an odd number of pixels, and to operate the N emitters with a corresponding time offset to avoid a shift of the next image frame relative to the first image frame due to delaying the scanning about the second axis.

The scanner may include a microelectromechanical system (MEMS) scanner having a reflector tiltable about two non-parallel axes. In operation, the fan of N light beams is converging at the tiltable reflector of the MEMS scanner. In some embodiments, the scanning projector display includes a pupil replicator optically coupled to the scanner for providing multiple offset copies of the fan of N light beams.

In accordance with the present disclosure, there is further provided a method for providing an image in angular domain. The method includes using a light engine comprising N emitters coupled to a collimator to provide a fan of N light beams of variable optical power levels, wherein N>1. A scanner is used to concurrently scan the fan of N light beams about first and second non-parallel axes, wherein the N emitters are spaced apart from each other such that pixels of the image concurrently energized by neighboring ones of the N emitters are non-adjacent. The optical power levels of the N emitters are varied with time delays selected such that adjacent pixels of the image are energized by different ones of the N emitters. The N emitters may be spaced apart from each other such that a spacing between the concurrently energized pixels is at least one of Nm−1, Nm, or Nm+1, wherein m is an integer.

In some embodiments, the method further includes continuously scanning the fan of N light beams about the first axis at a frame rate while concurrently scanning the fan of N light beams about the second axis at a line rate higher than the frame rate. The image may include first and second interlaced portions of image pixels, and the light engine may be operated to energize the first portion of the image pixels during a first scanning cycle about the first axis, and to energize the second portion of the image pixels during a subsequent second scanning cycle about the first axis.

The fan of N light beams may have an angular width defined along a direction of scanning about the first axis. The scanner may be operated for bidirectional scanning the fan of N light beams about the second axis. The N emitters may be operated during first and second opposed directions of the bidirectional scanning about the second axis. In some embodiments, the scanner is operated for unidirectional scanning the fan of N light beams about the first axis such that the fan of N light beams is scanned about the first axis by one angular width per each bidirectional scan about the second axis. The scanner may also be operated for bidirectional scanning of the fan of N light beams about the first axis such that the fan of N light beams is scanned about the first axis by two angular widths per each bidirectional scan about the second axis.

In some embodiments, the method may include displaying a first image frame during a first scanning cycle about the first axis, and displaying a next image frame during a next scanning cycle about the first axis. During the first scanning cycle, scanning trajectories of the fan of N light beams corresponding to the first and second directions of the bidirectional scanning intersect one another at a first grid of intersection points. During the next scanning cycle, scanning trajectories of the fan of N light beams corresponding to the first and second directions of the bidirectional scanning intersect one another at a second grid of intersection points. The scanning about the second axis may be delayed relative to scanning about the first axis such that the first and second grids of intersection points are offset relative to each other by an odd number of pixels, wherein the N emitters are operated with a corresponding time offset to avoid a shift of the next image frame relative to the first image frame due to delaying the scanning about the second axis. The frame rate may be higher than 50 Hz.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

In a scanning projector display, an image to be observed is formed by rapid scanning or rastering an optical beam across a field of view (FOV) of the display. There is generally a trade-off between the scanning speed and an optical quality of the beam, which translates into to the displayed image quality (for example frame rate and resolution). Larger beam sizes may be required for a better optical quality of the be beam and the resulting image, which requires larger scanners. However, larger scanners are typically slower. To provide faster overall scanning, a multi-emitter light source may be used, which enables several image pixels to be energized, or "painted", simultaneously as the scanner scans multiple light beams emitted by individual emitters. Due to construction limitations, individual emitters of the multi-emitter light source need to be separated from one another at distances large enough such that the individual emitters cannot be used to simultaneously paint or energize neighboring pixels of the image being displayed.

In accordance with the present disclosure, both horizontal and vertical directions may be continuously scanned. The simultaneous scanning induces tilt in the scanning lines. This is different from scanning the image one row of pixels after another, where rows of pixels are parallel. When both horizontal and vertical directions are simultaneously and continuously scanned as described herein, the resulting image is painted with lines that are tilted, and even cross one another. Delays may be introduced into the signals energizing individual emitters of a multi-emitter light source, such that adjacent pixels of the image may be energized by non-adjacent emitters. The scanning pattern may be coordinated with the energizing the individual emitters in such a manner that the entire image is painted quickly and efficiently.

Figure 1:
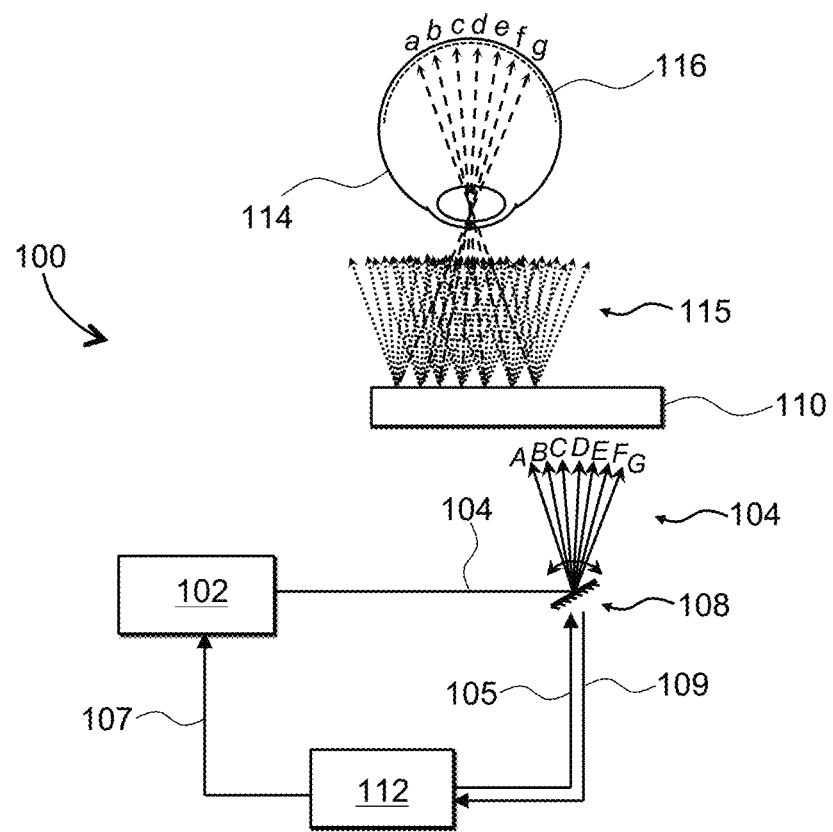
FIG. 1 is a schematic view of a scanning projector display of this disclosure.

Referring to FIG. 1, a scanning projector display 100 includes a light engine 102 based on a solid-state single-mode or multimode light source such as a light-emitting diode (LED), a superluminescent light-emitting diode (SLED), a side-emitting laser diode, a vertical-cavity surface-emitting laser diode (VCSEL), etc. In operation, the light engine 102 provides a single light beam 104. A light source with multiple light beams will be considered further below. A scanner 108, e.g. a microelectromechanical system (MEMS) including a tiltable reflector, is optically coupled to the light engine 102 for scanning the light beam 104 in two dimensions, e.g. about an X-axis and/or Y-axis perpendicular to the X-axis. The X- and Y-axes may be disposed in plane of the MEMS reflector at its normal i.e. unpowered position. Pre-tilted MEMS reflectors may also be used. A pupil replicator 110 provides a light field 115 including multiple laterally displaced parallel copies of the scanned light beam 104.

A controller 112 is operably coupled to the light engine 102 and the scanner 108. The controller 112 may be configured for providing driving signals 105 to the scanner 108, and control signals 107 to the light engine 102 in coordination with operating the scanner 108. For example, the controller 112 may cause the scanner 108 to scan the light beam 104 through a succession of directions "A" through "G" in coordination with causing the light engine 102 to change the optical power level of the light beam 104, to form an image in angular domain. In other words, the directions "A" through "G" are directions of the same scanned light beam 104. A feedback circuit may be provided to provide information about the current MEMS reflector angular position by means of feedback signals 109 to the controller 112. The feedback signals 109 may include, for example, temporal sampling of the X and Y MEMS angular position, sync signals at specific pre-determined MEMS reflector tilt angles, etc.

The pupil replicator 110 provides multiple laterally displaced parallel copies of the light beam 104 as the light beam 104 is scanned by the scanner 108 through directions "A", "B", "C", "D", "E", "F", and "G". A viewer's eye 114 receives the light field 115, and forms an image at the eye's retina 116 from the corresponding replicated light beams at various angles. A linear position of the beam copies on the eye's retina 116 is denoted with letters "a" through "g", and corresponds to the directions "A" through "G" of the scanned light beam 104. In this manner, the eye 114 forms a linear image on the eye's retina 116 from the image in the angular domain formed by the light field 115. The scanning is preferably performed faster than the integration time of the eye 14, such that the eye 114 perceives a continuous, non-flickering image.

Figure 2A:
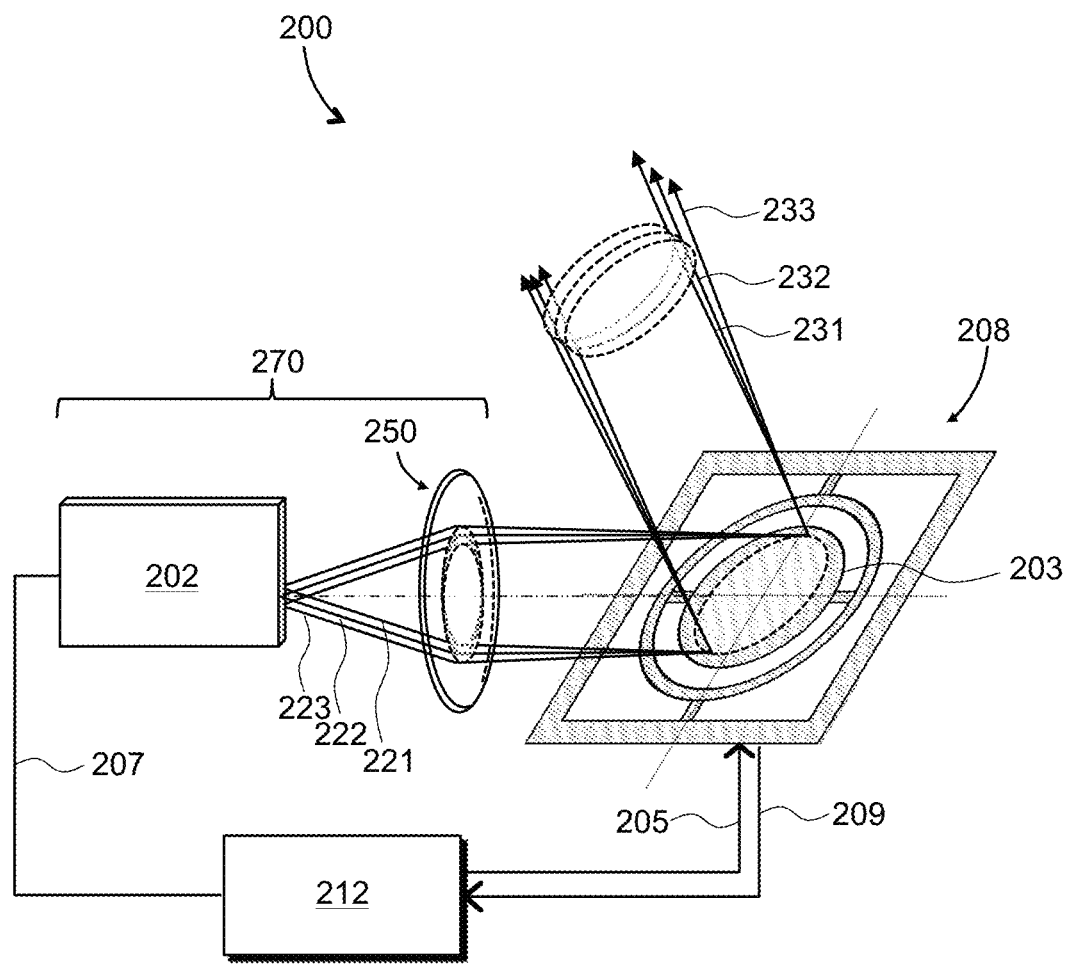
FIG. 2A is a schematic view of a scanning projector display embodiment using a microelectromechanical system (MEMS) scanner and a multi-emitter light source.

Referring to FIG. 2A, a scanning projector display 200 is an embodiment of the scanning projector display 100 of FIG. 1. The scanning projector display 200 of FIG. 2A includes not a single-emitter but a multi-emitter light source 202, e.g. a superluminescent light emitting diode (SLED) array on a semiconductor substrate, providing a plurality of diverging light beams, i.e. three diverging light beams 221, 222, and 223 in this example. A collimator 250 is optically coupled to the multi-emitter light source 202. The collimator 250 may include a lens, a folded-path optical element having focusing power, a concave reflector, a diffractive lens, etc. The collimator 250 collimates the diverging light beams 221, 222, and 223 to obtain respective collimated light beams 231, 232, and 233. Together, the multi-emitter light source 202 and the collimator 250 form a light engine 270. The collimated light beams 231, 232, and 233 converge onto a tiltable reflector 203 of a 2D MEMS scanner 208. A pair of 1D MEMS scanners coupled via a pupil relay may be used in place of the 2D MEMS scanner 208.

A controller 212 is operably coupled to the multi-emitter light source 202 and the 2D MEMS scanner 208. The controller 212 may be configured to provide control signals 207 to the multi-emitter light source 202 in coordination with operating the 2D MEMS scanner 208 by providing driving signals 205 to scan the collimated light beams 231, 232, and 233, to provide an image in angular domain. Feedback signals 209 may be provided by the MEMS scanner 208 to the controller 212 to facilitate determination of the current tilt angle(s) of the tiltable reflector 203 by the controller 212. When viewed by the human eye 114, the image in angular domain is projected by the eye's cornea and lens to become a spatial-domain image on the eye's retina 116, as explained above with reference to FIG. 1.

The controller 212 may look up an image to be displayed, e.g. a current frame of a video feed, and determine which pixel or pixels correspond to the current X- and Y-tilt angles of the tiltable reflector 203. From that, the controller 212 may determine the corresponding brightness and/or color value of the pixels. Several pixels are looked up because the multi-emitter light source 202 includes a plurality of individually and simultaneously energizable emitters, each "painting" or energizing its own pixel. The controller 212 then provides the control signals 207 to operate the multi-emitter light source 202 at power levels corresponding to the required brightness and color of the pixel(s) being painted.

Figure 2B:
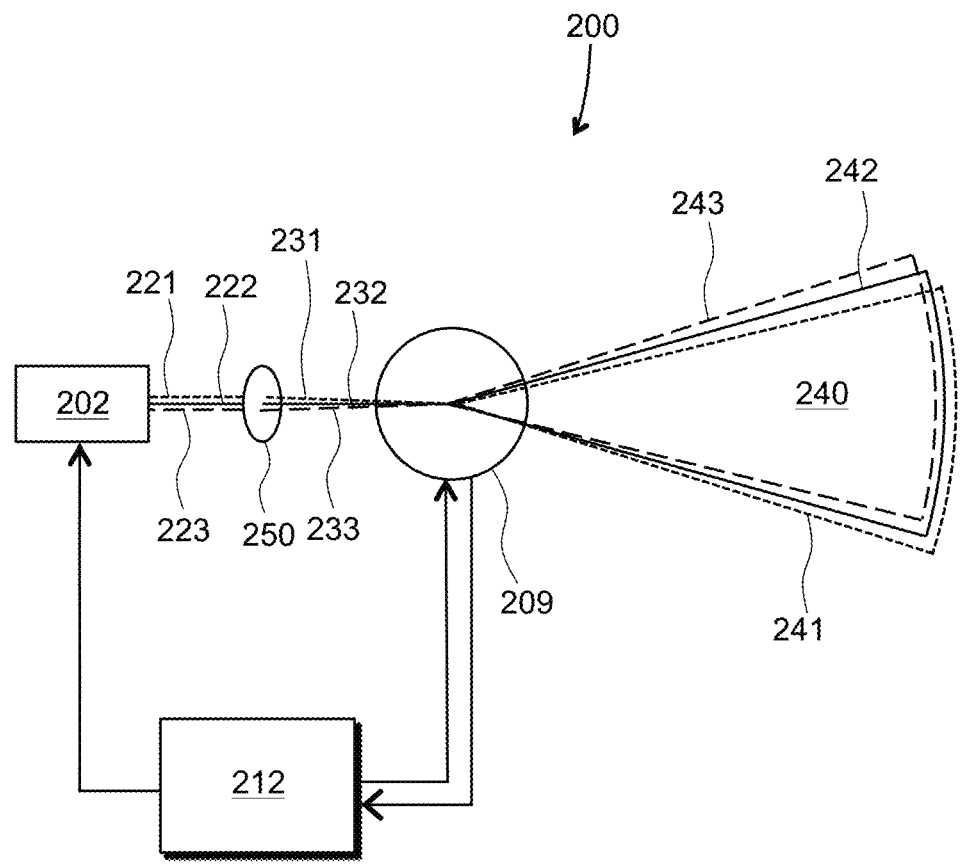
FIG. 2B is a schematic top view of the scanning projector display of FIG. 2A illustrating a relationship between fields of view provided by individual emitters of the multi-emitter light source.

The operation of the scanning projector display 200 is further illustrated in FIG. 2B. The multi-emitter light source 202 includes three emitters each providing a diverging light beam: (only chief rays shown) 221 (dotted lines), 222 (solid lines), and 223 (dashed lines). At least two emitters, or four or more emitters may be provided. The collimator 250 collimates the diverging light beams 221, 222, and 223. By selecting suitable geometry e.g. distances and focal length of the collimator 250, the latter may also cause the collimated light beams 231, 232, and 233 to converge at a center of the reflector 203 at slightly different angles of incidence, for scanning the fan of three collimated light beams 231, 232, and 233 together. Since the angles of incidence of the collimated light beams 221, 222, and 223 onto the tiltable reflector 209 are different, respective scanning areas 241 (dotted lines), 242 (solid lines), and 243 (dashed lines) of the collimated light beams 231, 232, and 233, respectively, are mutually offset as shown. When individual emitters are separated from one another, the respective pixels being painted are non-adjacent, i.e. may be separated by one or more pixels in the image domain. The controller 212 may take these spatial offsets into account by providing corresponding delays to the driving signals of the three emitters of the multi-emitter light source 202. Spatial offsets, in combination with the delays in energizing individual emitters, may be provided such as to effectively triple the spatial resolution of the projector display 200 in a common scan area 240, as compared to a case of a single emitter. Spatial offsets may also provide a higher rate for a given oscillation frequency of the tiltable reflector 203 of pixel painting in the scan area by painting multiple pixels simultaneously.

Figure 3:
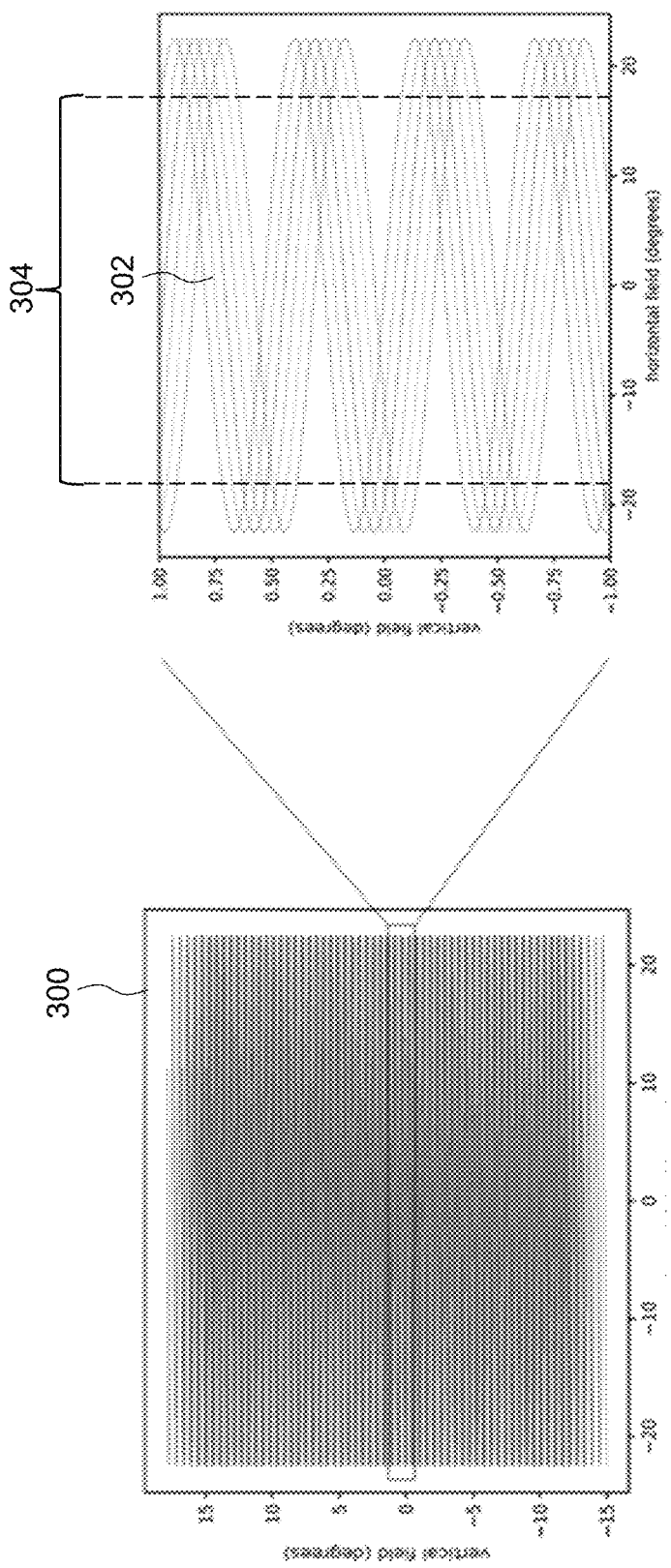
FIG. 3 shows scanning trajectories the MEMS scanner of FIGS. 2A and 2B resulting from simultaneous scanning about two orthogonal axes.

Turning to FIG. 3, a Y-tilt (vertical tilt) of the tiltable reflector 203 is plotted against an X-tilt (horizontal tilt) across a field of view (FOV) 300 of a scanning projector display. Herein, the terms "vertical" and "horizontal" are used for convenience only, and actual axes of tilt may be arbitrarily oriented for as long as they are non-parallel. Furthermore, because both scans are performed concurrently, the scanning trajectory may be at an acute angle to an FOV 300 edge, and in fact may almost always deviate from horizontal or vertical. In this example, the vertical scan (i.e. the scan about horizontal axis, or Y-axis) is approximately linear, and the horizontal scan (i.e. the scan about vertical axis, or X-axis) is sinusoidal. The combination of the two results in the scanning lines not being horizontal, but rather angled, and crossing each other, as seen in the right-side diagram of FIG. 3. Sinusoids 302 may have nearly straight sections 304, but these are not horizontal due to the both scans about X and Y axes being performed at the same time. Such scanning configuration enables faster and more energy-efficient scanning, because the vertical scanning may be performed in a near-resonant mode. The MEMS scanner 208 may be configured to continuously scan a fan of light beams, about horizontal axis at a frame rate, e.g. 50 Hz or higher, while continuously scanning the fan of light beams about the second axis at a line rate higher than the frame rate. It is further noted that the position of the sinusoids 300 in the field of view 300 may be controlled by providing delays of the Y-scan relative to the beginning of the X-scan. In some embodiments, the frame rate is approximately 100 Hz, e.g. 95 Hz, 100 Hz, or 105 Hz. The exact frame rate may depend e.g. on the number of light sources, the MEMS scanning speeds, and the selected display resolution.

Figure 4:
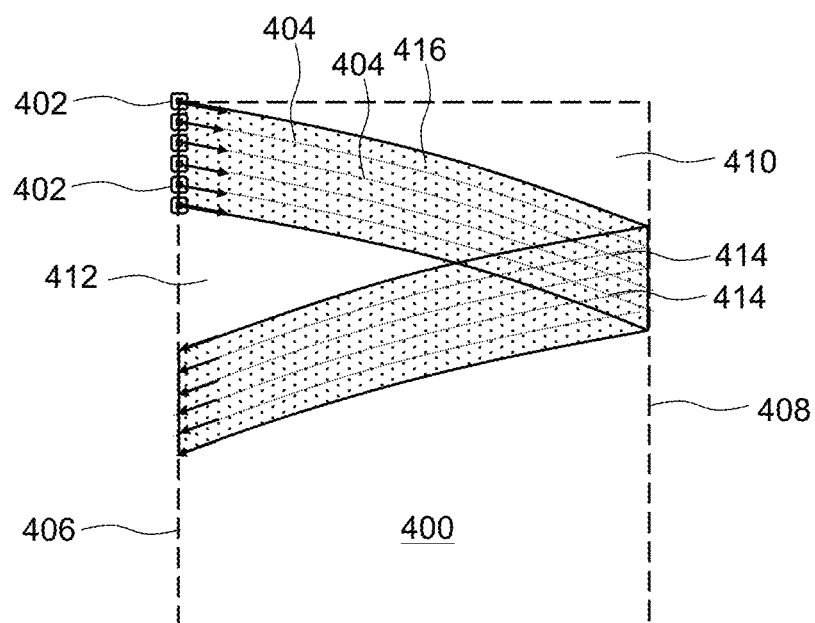
FIG. 4 is an FOV diagram illustrating painting of an image by a fan of scanning optical beams emitted by a multi-emitter light source.

The scanning of a fan of light beams generated by a multi-emitter light engine is considered in more detail in FIG. 4. In this example, the multi-emitter light engine includes an array of six emitters spaced apart by more than a width of a single emitter or a beam width, such that pixels 402 of the image simultaneously energized by neighboring ones of the N emitters are non-adjacent, i.e. there are other image pixels between them. When a scanner scans a fan of light beams generated by the array of emitters, scanning trajectories 404 run parallel to one another, but not necessarily straight, across an FOV 400. The scanning trajectories 404 run from a left boundary 406 of the FOV 400 to a right boundary 408, and then back to the left boundary 406. As explained above, the scanning trajectories 404 are not horizontal but tilted or slanted, because both X- and Y-scans are performed concurrently. This is different from e.g. a raster scan in a cathode ray tube (CRT) of a television set where each image line is horizontal. The scanning shown in FIG. 4 is more reminiscent of painting a wall in a zigzag pattern.

The zigzag scanning geometry illustrated in FIG. 4 may leave certain areas not covered by scanning, at least initially. For example, areas 410 and 412 of the FOV 400 are not yet covered by the scanning trajectories 404. Another challenge is that, in contrast to a CRT-like scanning, the scanning trajectories 404 cross each other at intersection points 414. Yet another issue to address in this scanning configuration is that interline gaps 416 of non-energized image pixels are present between the scanning trajectories 404. All these issues may be overcome in a number of ways, as explained further below.

Figure 5:
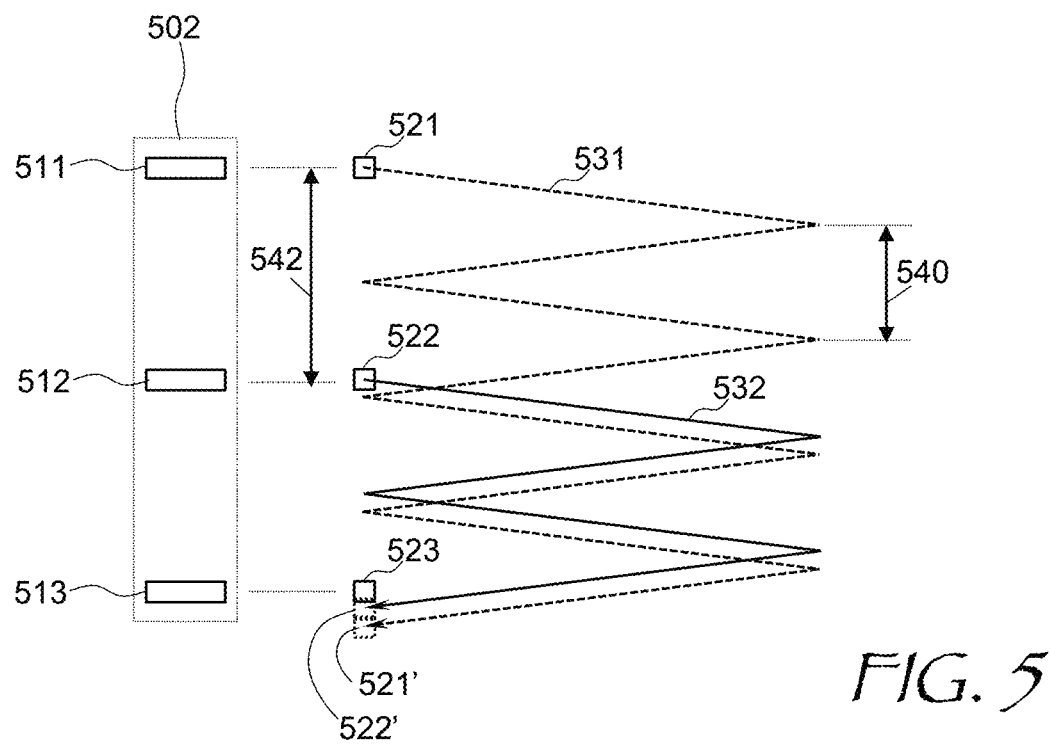
FIG. 5 is a schematic FOV plot illustrating the process of energizing adjacent pixels of the image by spaced-apart emitters of the multi-emitter light source of FIG. 4.

The interline gaps 416 will be addressed first. Referring to FIG. 5, pixels 521, 522, and 523 of an image to be painted are simultaneously energized by emitters 511, 512, and 513 of a multi-emitter light source 502. The emitters 511, 512, and 513 of the light source are spaced apart from one another, which causes the pixels 521, 522, and 523 to be spaced apart from one another. It is noted for clarity that the individual emitters 511, 512, and 513 are spaced apart in linear domain, while the pixels 521, 522, and 523 are spaced apart in angular domain, because the image being rastered is in angular domain. The conversion of the linear position of the emitters 511, 512, and 513 into the relative angular position of the pixels 521, 522, and 523 of the image in angular domain may be performed by a collimator of the light engine, e.g. the collimator 250 of the light engine 270 of the scanning projector display 200 of FIGS. 2A and 2B. As shown in FIGS. 2A and 2B, the light engine 270 provides a fan of light beams 231, 232, and 233 converging onto the tiltable reflector 203 of the MEMS scanner 208.

Referring back to FIG. 5, scanning trajectories 531 (dashed lines) and 532 (solid lines) of the beams produced by the emitters 511 and 512, respectively, are presented. The scanning trajectories 531 and 532 are shown with straight lines for simplicity. In practice, scanning trajectories 531 and 532 are curved, which does not impact the principles considered herein.

The scanning trajectories 531 and 532 are characterized by a drop-per-line parameter 540, which is a vertical drop of the scanning trajectory upon one cycle of zigzag scanning right and left, or left and right. The drop-per-line parameter 540 depends on a relative speed of horizontal and vertical scanning, which can be determined from a ratio of the line rate to the frame rate. In accordance with an aspect of the present disclosure, spacing 542 between the simultaneously energized pixels 521, 522, and 523 and the drop per line parameter 540 may be selected such that adjacent pixels 523, 522', and 521' are eventually energized by different ones of the emitters 511, 512, and 513, even though the emitters 511, 512, and 513 are spaced apart by a distance corresponding to more than one pixel in angular domain.

Figure 6:
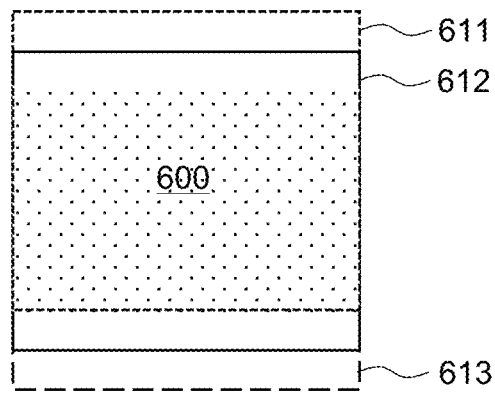
FIG. 6 is an FOV diagram showing FOV portions energized by different emitters of the multi-emitter light source.

For example, the scanning trajectory 532 of the light beam emitted by the second emitter 512 ends at the adjacent pixel 522' after two full zigzag periods (i.e. two drops per line 540), and the scanning trajectory 531 of the light beam emitted by the first emitter 511 ends at the adjacent pixel 521' after four full zigzag periods (i.e. four drops per line 540). By configuring the display controller to select proper time delays between energizing the emitters 511, 512, and 513, all pixels in a common FOV area 600 of FIG. 6 of FOVs 611 (short-dash lines), 612 (solid lines), and 613 (long-dash lines) corresponding to individual emitters 511, 512, and 513 of FIG. 5 may be energized. It turns out that one can select the spacing 542 and the drop per line parameter 540 to scan without a gap between scanning lines in the common FOV area 600 when N emitters of a light engine are spaced apart such that a spacing between the simultaneously energized pixels is Nm+1, where N and m are integers. The condition Nm+1 is only meant as an example, and other conditions may be applied, for example Nm or Nm−1, to achieve a similar result using configurations and principles disclosed herein (note the vertical MEMS dropping speed needs to be adjusted in each case).

Figure 7A:
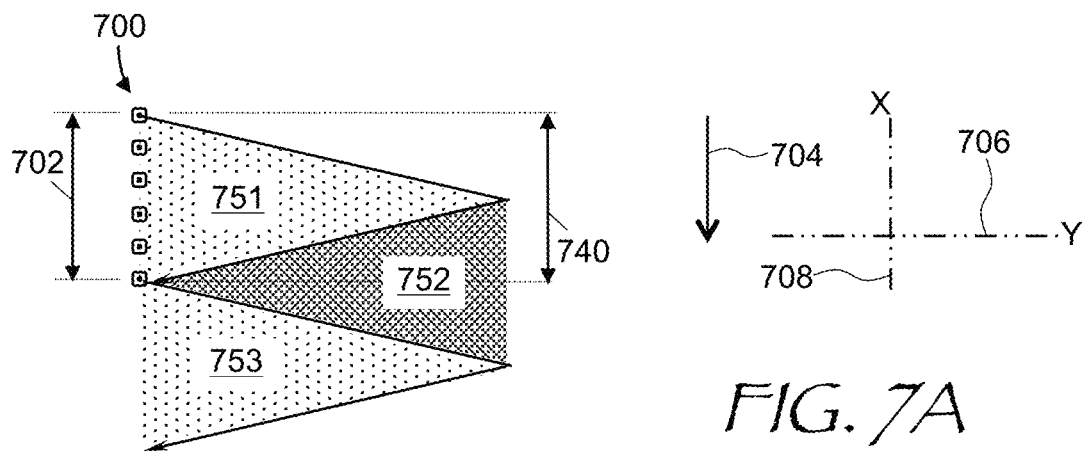
FIGS. 7A, 7B, and 7C are FOV diagrams illustrating the process of FOV painting for the case of unidirectional vertical scan.
Figure 7B:
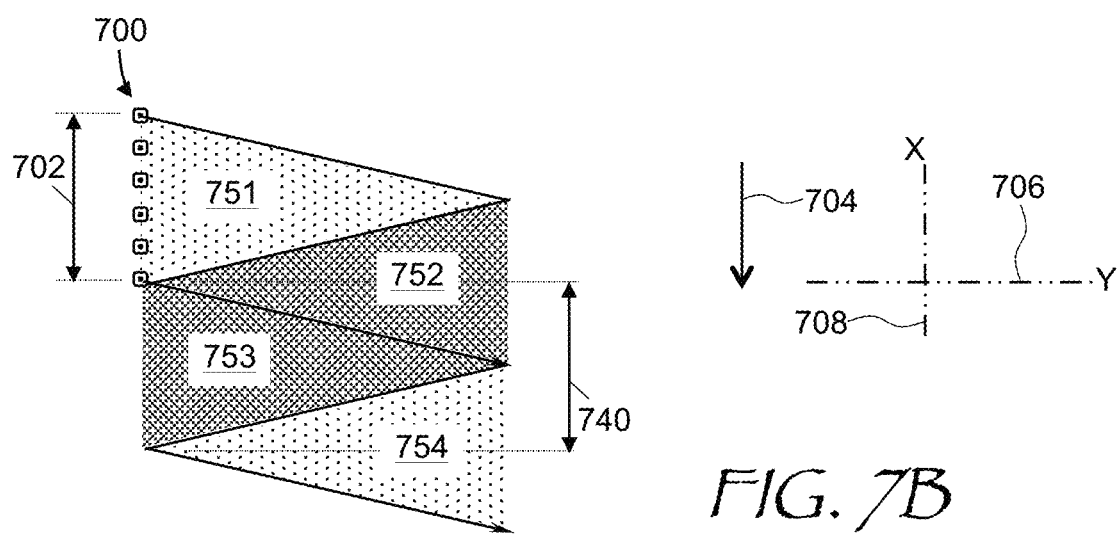
Figure 7C:
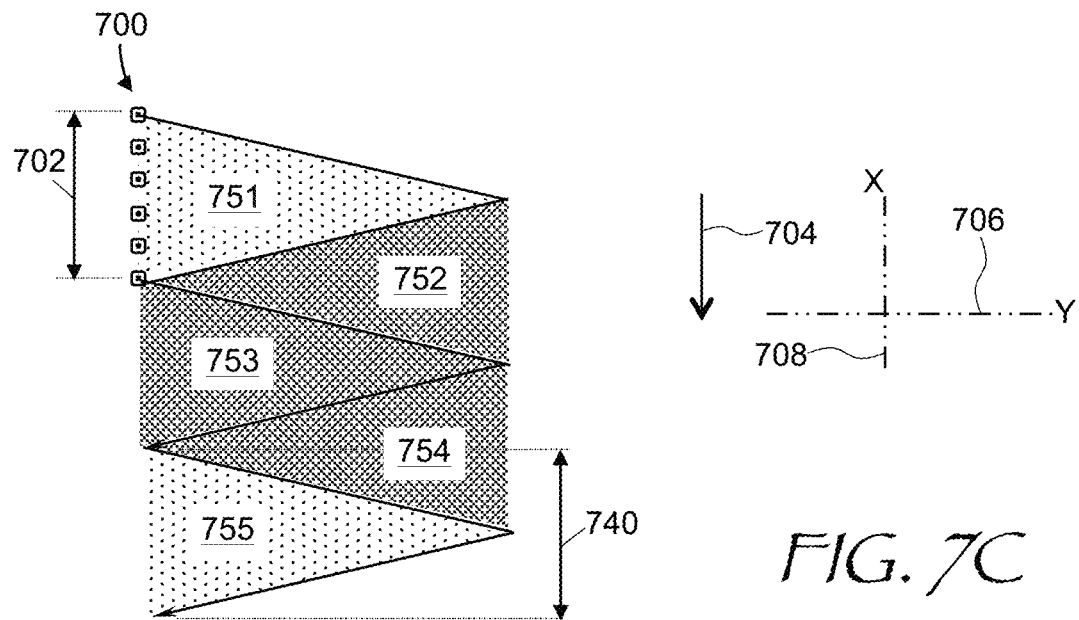

The non-scanned areas 410 and 412 in FIG. 4 may be covered during subsequent scanning cycles. Referring to FIGS. 7A to 7C, a fan 700 of N light beams (N=6 in this example) has an angular width 702. Herein, the term "angular width" denotes a total fan angle of the fan 700. The angular width 702 is defined along a direction of scanning 704 about Y-axis 706, i.e. vertically in FIGS. 7A to 7C. As in previous examples, all N light beams of the fan 700 are scanned together by a common scanner, and as a consequence the angular separation between the N light beams remains constant during scanning.

In some embodiments of this disclosure, the scanner may be operated by a projector display controller to perform unidirectional scanning of the entire fan 700 of N light beams about Y-axis 706 (i.e. from top to bottom in FIGS. 7A to 7C) such that the fan 700 is scanned about Y-axis 706 by one angular width 702 per each bidirectional scan about X-axis 708 (i.e. left to right and back in FIGS. 7A to 7C). Each bidirectional scan is characterized by a drop per line parameter 740, which is a vertical distance covered by the vertical scan during one scan left and right. In other words, unidirectional scanning of the entire fan 700 about Y-axis 706 is performed such that the angular width 702 of the fan 700 is equal to one drop per line parameter 740. The scanning initially covers left-side triangular areas 751 and 753 once, and a right-side triangular area 752 twice (darker shading in FIG. 7A). As the scanning progresses and the scanner scans to the right again (FIG. 7B), the bottom left-side triangular area 753 is covered twice, and a next right-side triangular area 754 is covered once. This area, however, is going to be covered for the second time during next horizontal scan to the left (FIG. 7C), and a next left-side triangular area 755 becomes covered once. In this manner, each triangular area may be eventually covered twice, enabling one to increase image resolution and/or provide redundancy, if so required. Such a double-pass scanning configuration may also be utilized to overwrite missing pixels, create a uniform pixel update rate distribution across the field of view of the display, etc.

Figure 8:
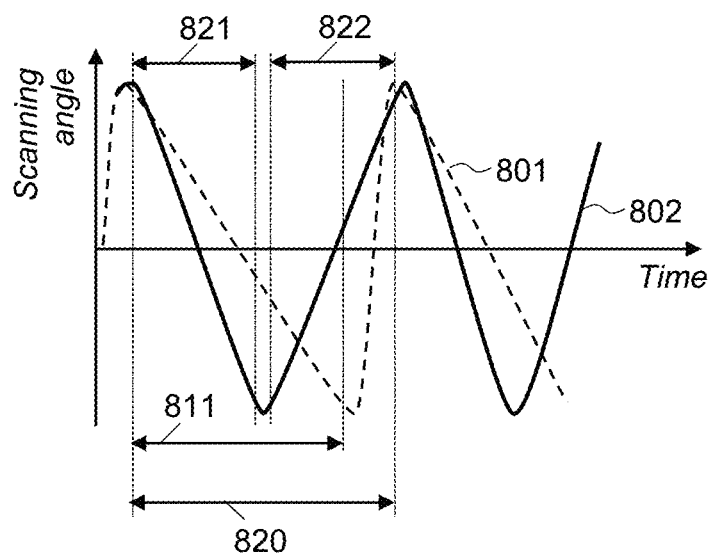
FIG. 8 is a comparative plot of scanner's reflector vertical tilt angle as a function of time for unidirectional and bidirectional vertical scans.

In some embodiments of this disclosure, the scanner of a projector display may be operated by a display controller to perform concurrent bidirectional scanning about both X- and Y-axes. Referring to FIG. 8, unidirectional 801 and bidirectional 802 vertical (i.e. about Y-axis) scanning angles are plotted vs. time for comparison. For unidirectional scanning, a unidirectional useful frame portion 811 during which pixels of the image can be energized, or painted, is smaller than a frame period 820. For bidirectional scanning, a total bidirectional useful frame portion, i.e. a sum of a downward portion 821 and an upward portion 822, is also smaller than the frame period 820, but may be larger in total than the unidirectional useful frame portion 811. Therefore, in the example shown, the bidirectional vertical scanning is more efficient than the unidirectional vertical scanning; however, it is to be noted that the bidirectional vertical scanning requires a higher scanning rate than unidirectional vertical scanning. In other words, a slope of the bidirectional vertical scanning angle 802 vs. time is steeper than a slope of the unidirectional vertical scanning angle 801 vs. time. This faster motion may cause additional motional artifacts of the MEMS scanner, e.g. cross-coupling and excitation of higher harmonic modes, depending on the MEMS scanner type used. Alternatively, the frame rate may be reduced, e.g. by a factor of two.

Figure 9A:
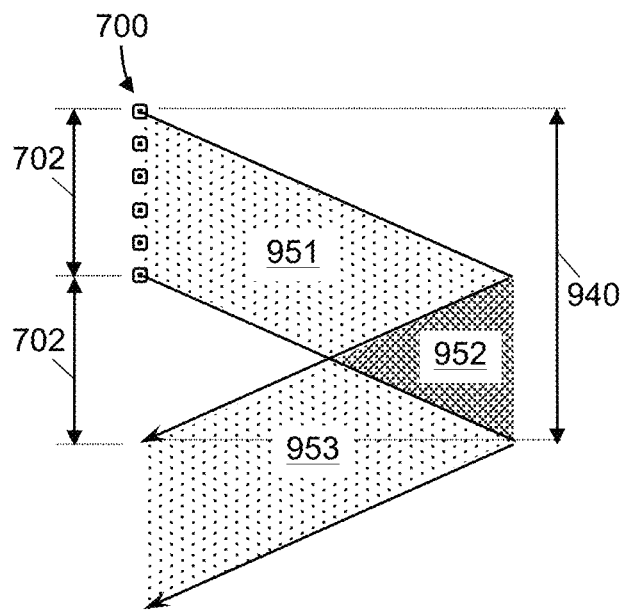
FIGS. 9A, 9B, 9C, and 9D are FOV diagrams illustrating the process of FOV painting for the case of bidirectional vertical scan.
Figure 9A:
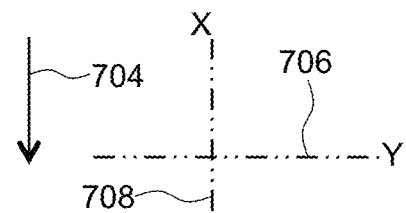

The process of energizing image pixels during bidirectional scanning about both X- and Y-axes is illustrated in FIGS. 9A to 9D. Referring first to FIG. 9A, the fan 700 of N light beams (N=6 in this example) having the angular width 702 is scanned about Y-axis 706 downwards, i.e. along the direction of scanning 704, and at the same time is scanned about the X-axis 708 bidirectionally, to the right and then back to the left, as shown. In this scanning configuration, the scanner may be operated by the display controller to scan the fan 700 about Y-axis 706 (i.e. from top to bottom in FIGS. 7A to 7C) such that the fan 700 is scanned about Y-axis 706 by two angular widths 702 per each bidirectional scan about X-axis 708 (i.e. left and right in FIG. 9A). In other words, the scanning of the entire fan 700 about Y-axis 706 is performed such that the drop per line 940 is substantially equal to two angular widths 702. Upon the completion of the first right-left scanning cycle, left-side trapezoidal areas 951 and 953 are covered once, and a right-side triangular area 952 is covered twice (darker shading in FIG. 9A).

Figure 9B:
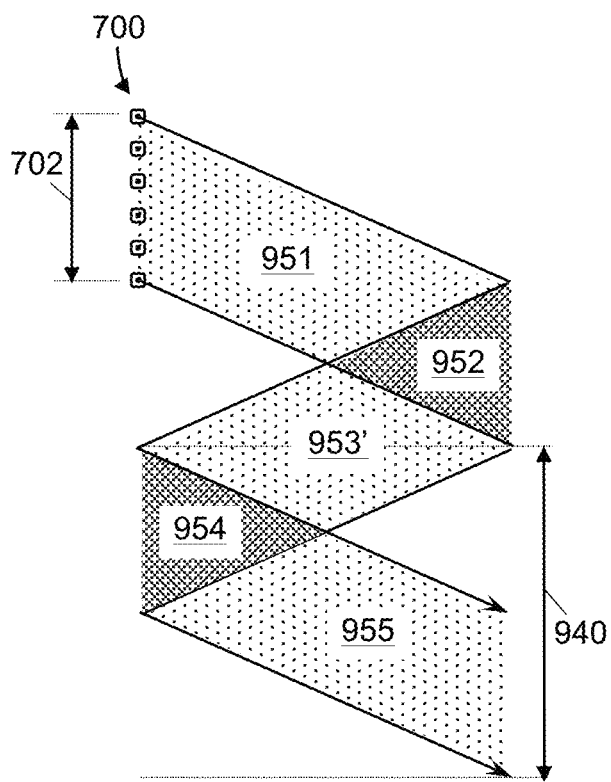
Figure 9B:
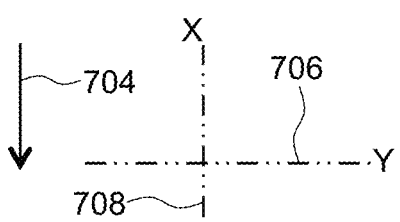

FIG. 9B shows the scanning coverage map after next right-to-left scanning. The top left-side trapezoidal area 951 remains scanned once, and the top right-side triangular area 952 remains scanned twice. Out of the bottom trapezoidal area 953, a rhombic portion 953' remains scanned once, and a left-side triangular portion 954 is scanned twice. A right-side trapezoidal area 955 is also scanned once.

Figure 9C:
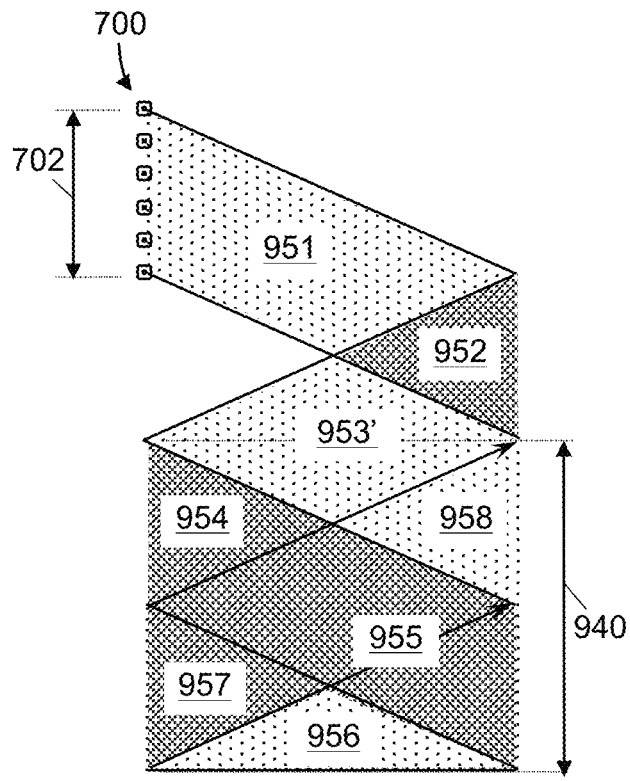
Figure 9D:
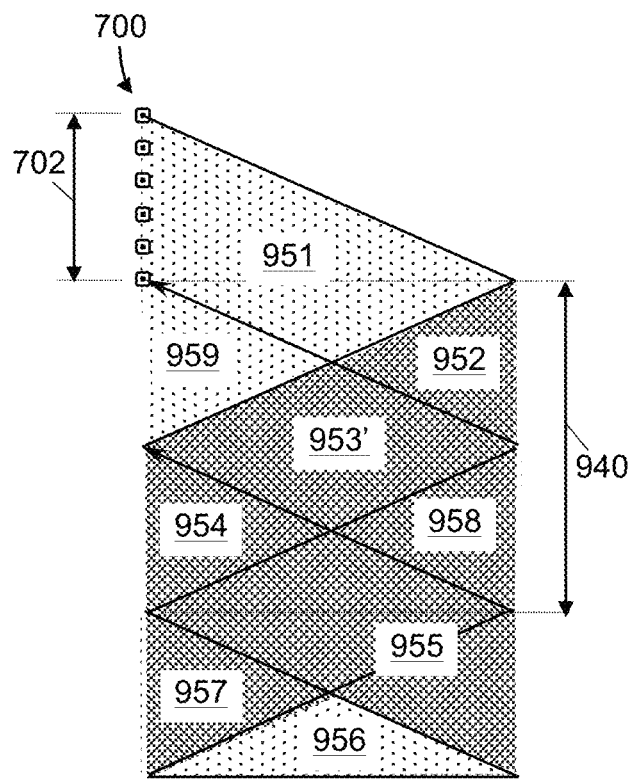

FIG. 9C shows the scanning coverage map after two right-left scanning cycles and one subsequent left-to-right scanning. It is noted that during the lowermost right-to-left scanning, the vertical scanning is not performed, and during the subsequent left-to-right scanning, the vertical scanning is resumed in an upward direction. When this scanning is done, the right-side trapezoidal area 955 ends up being scanned twice, a bottom left triangular area 957 is scanned twice, and a middle right-side triangular area 958 is scanned once. A bottom center triangular area 956 is scanned once, as well.

At the next right-to-left scanning (FIG. 9D), the vertical scanning is still going in the upward direction. The middle right-side triangular area 958 and the rhombic portion 953' are scanned twice, and a top left triangular area 959 is scanned once, and so on. At the end of the bidirectional scanning about X-axis 708, most of the scan area (except for top and bottom center triangular areas) is scanned twice. The operational FOV may be adjusted to only include areas scanned twice, enabling one to increase image resolution and/or provide redundancy, if so required. This scanning configuration may also be utilized to overwrite missing pixels, create a uniform pixel update rate distribution across the field of view of the display, etc.

Figure 10:
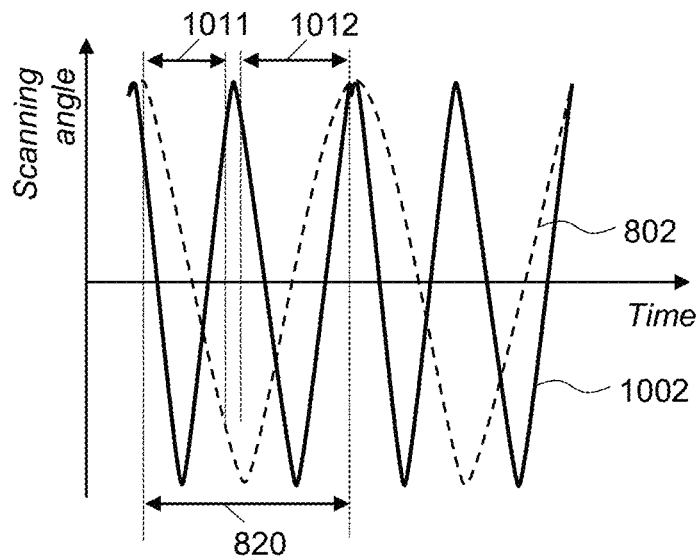
FIG. 10 is a plot of scanner's reflector vertical tilt angle as a function of time comparing non-interlaced and interlaced image painting.

In some embodiments of this disclosure, the vertical scanning, i.e. scanning about the Y-axis, may be accelerated such that only a portion of all pixels of the image in angular domain is energized at the completion of each accelerated bidirectional scan about Y-axis. Referring to FIG. 10, an accelerated vertical scanning angle 1002 is plotted vs. time. The vertical scanning angle 802 of FIG. 8 is reproduced in FIG. 10 for comparison purposes. The accelerated vertical scanning angle 1002 (about Y-axis) changes with time twice faster than the vertical scanning angle 802, completing first 1011 and second 1012 bidirectional scanning cycles per each vertical scanning angle 802 bidirectional cycle. The controller of the projector display may be configured to operate the light engine to energize first and second interlaced portions of image pixels in sequence. The first portion of the image pixels is energized during the first scanning cycle 1011, and the second portion of the image pixels is energized during the subsequent second scanning cycle 1012. The interlacing, i.e. painting of different pixel groups on different passes, can be achieved by introducing a phase shift/wait time of the next vertical scan with respect to the horizontal scan.

More generally, an $n^{th}$ order interlacing may be employed. Only after n full passes the pixel painting process, i.e. the pixel energizing process, comes back to its original position. Such high-order interlacing can be used when many missed pixels are present in a scan, and/or when the distribution of pixel refresh rates is non-uniform, which may be the case when implementing distortion corrections, for example.

It is to be understood that this and other scanning configurations disclosed herein may be applied at different scanning speeds. For example, the vertical and horizontal scanning speeds may be proportionally slowed down, and the two (or more) interlaced portions of the image pixels may be energized at subsequent bidirectional vertical scans. Furthermore, in some embodiments, each vertical bidirectional scanning cycle, e.g. the first 1011 and the second 1012 scanning cycles, may be presented with successive frames, e.g. different frames of a video feed. For non-moving portions of the video frame, this may improve the local spatial resolution, and for moving portions, this may improve the local image update speed, providing a smoother displacement of quickly moving objects in the frame.

Figure 11:
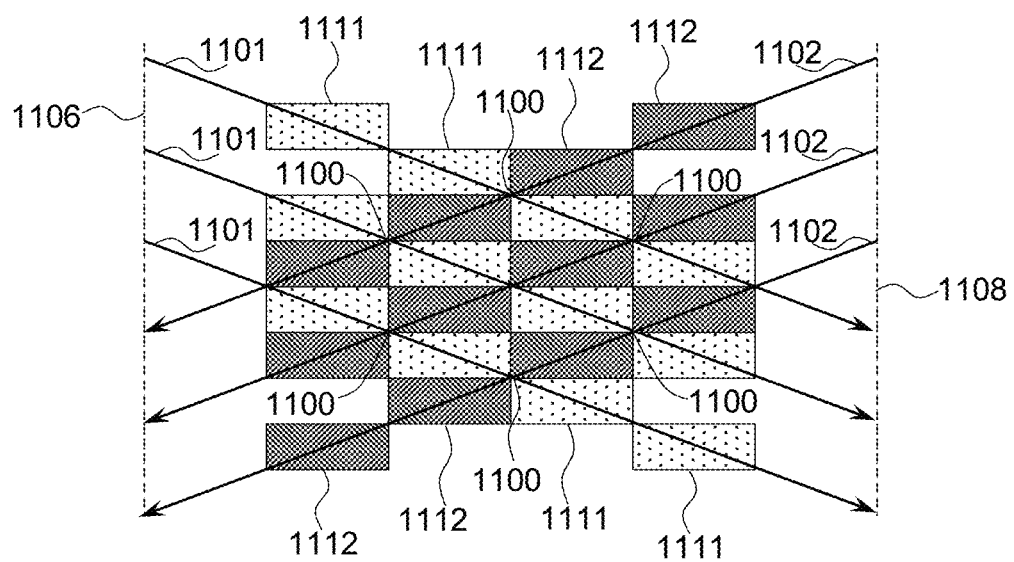
FIG. 11 is an FOV diagram illustrating a grid of intersection points of scanning trajectories due to simultaneous scanning about horizontal and vertical axes.

One aspect of having both the horizontal and vertical scanning performed continuously and concurrently is that the scanning trajectories are tilted relative to FOV edges. Furthermore, the scanning trajectories, along which pixels of an image in angular domain are energized or painted, may cross each other, forming a grid of intersection points. Turning to FIG. 11, first 1101 and second 1102 scanning trajectories corresponding to scanning downwards about Y-axis while bidirectionally scanning about X-axis (i.e. left to right and right to left), are presented. The first scanning trajectories 1101 correspond to scanning from left to right in FIG. 11, and the second scanning trajectories 1102 correspond to scanning from right to left. The scanning is performed between left 1106 and right 1108 FOV boundaries.

The first 1101 and second 1102 scanning trajectories intersect at a grid of intersection points 1100. Different scanning trajectories of the first 1101 and second 1102 scanning trajectories correspond to different emitters. Dotted rectangles 1111 denote image areas energized or painted by corresponding individual emitters during left-to-right scans, and shaded rectangles 1112 denote image areas energized or painted by corresponding individual emitters during right-to-left scans. The dotted 1111 and shaded 1112 rectangles correspond to different arrays of image pixels.

The grid of intersection points 1100 of the first 1101 and second 1102 scanning trajectories may cause image artifacts. Since the pixels at the grid of intersection points 1100 are essentially energized twice, it may show in a displayed image as a brightness modulation grid superimposed on the image. Even when the brightness of the light beams at the intersection points is adjusted at the intersection points 1100 to reduce the grid effect, it still may show up due to ability of a human eye to pick up low-contrast extended shapes and lines in an image.

Figure 12:
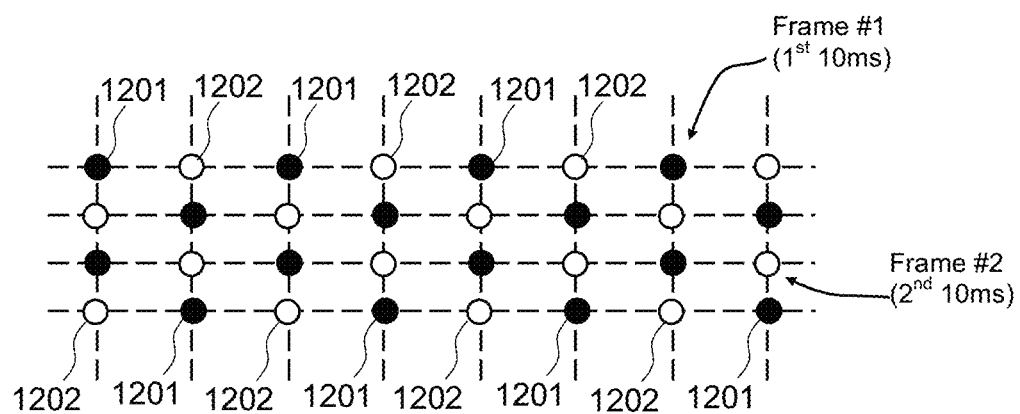
FIG. 12 is an FOV diagram illustrating interlaced grids of intersection points of neighboring image frames.

To address the issue of the brightness modulation grid, a controller of the scanning projector display may be configured to display a first 10-millisecond long image frame during a first vertical scanning cycle (i.e. scanning about Y-axis), and a next 10-millisecond long image frame during a next vertical scanning cycle. Other frame rates may of course be used. During the first scanning cycle, scanning trajectories of the fan of N light beams corresponding to the different directions of the bidirectional scanning intersect one another at a first grid of intersection points 1201 (FIG. 12) shown as black circles. During the next scanning cycle, scanning trajectories of the fan of N light beams corresponding to the different directions of the bidirectional scanning intersect one another at a second grid of intersection points 1202 shown as white circles. The projector display controller may be configured to delay the scanning about X-axis relative to scanning about Y-axis, such that the first 1201 and second 1202 grids of intersection points are offset relative to each other by one pixel as shown in FIG. 12, or by an odd number of pixels. The N emitters are operated with a corresponding time offset to avoid a shift of the second image frame relative to the first image frame due to delaying the scanning about the X-axis relative to scanning about Y-axis.

It is noted that the first and second frames may, but do not need to, have the same content. If the frames are allowed to be different being e.g. two successive frames of a video stream, then the frame rate will remain 10 ms, while the brightness modulation grid refresh rate will be 20 ms. Other frame rates and durations may be used, with the same principle applied.

It is to be understood that the term "pixel" of an image in angular domain, as used in this specification, refers to an element of the image that has fixed coordinates in the image. However, scanning trajectories of individual emitters of a multi-emitter light engine are generally not parallel to a rectilinear pixel grid of the image, forming an acute angle with respect to the rectilinear image pixel grid. Because of this, the scanning trajectories do not necessarily go through a center of each pixel in both X and Y. In fact, most often the scanning trajectories do not go through the pixel centers, i.e. there is almost always a non-zero distance from the pixel center. The brightness of corresponding emitters may need to be adjusted to take this into account.

Figure 13:
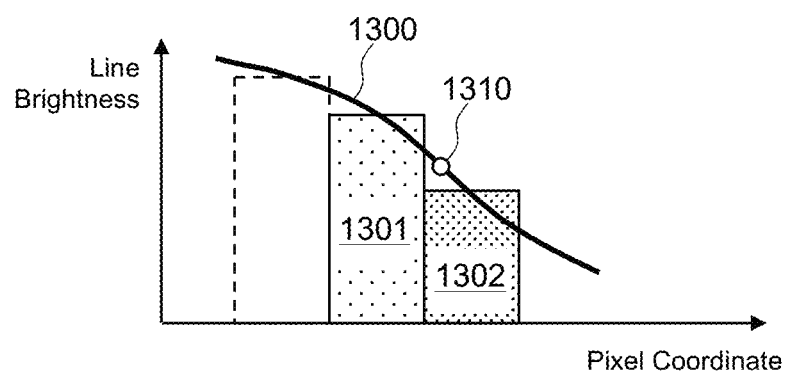
FIG. 13 is a plot of inter-pixel light beam brightness vs. pixel coordinate during image painting.

One embodiment of the brightness adjustment is illustrated in FIG. 13, which shows a scanning trajectory 1300 extending across first 1301 and second 1302 pixels of an image to be displayed. The brightness of light emitted by the emitter, or the pulse energy of light pulses emitted by the emitter, may be adjusted such that at a location 1310 between the first 1301 and second 1302 pixels, the brightness or pulse energy is weighted in proportion to a proximity to a center of the particular pixel or pixels.

Figure 14:
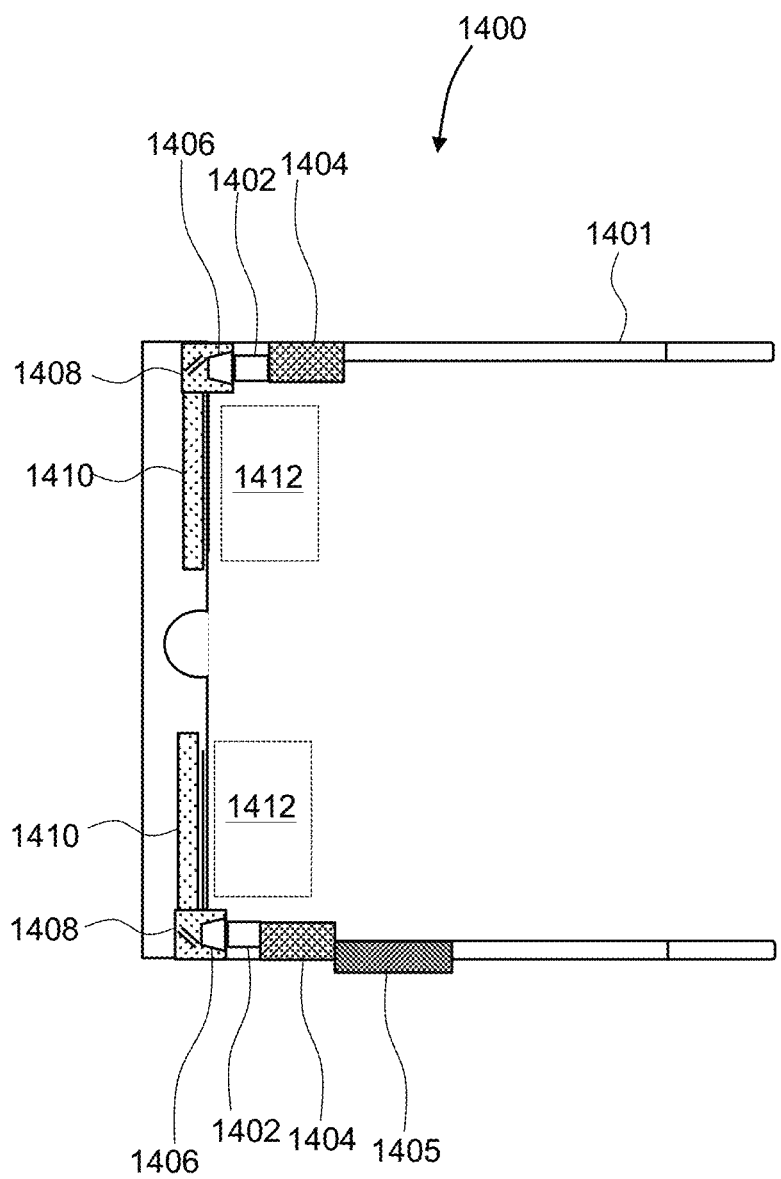
FIG. 14 is a top schematic view of an NED having a form factor of a pair of eyeglasses.

Referring to FIG. 14, a near-eye display 1400 includes a frame 1401 having a form factor of a pair of eyeglasses. The frame 1401 supports, for each eye: a multi-emitter light source subassembly 1402, an electronic driver 1404 operably coupled to the light source subassembly 1402 for powering the emitters of the light source subassembly 1402 for providing a plurality of light beams, a collimator 1406 optically coupled to light source subassembly 1402 for collimating the plurality of light beams, a scanner 1408 optically coupled to the collimator 1406, and a pupil replicator 1410 optically coupled to the scanner 1408. The light source subassembly 1402 may include a substrate supporting an array of single-mode or multimode semiconductor light sources, e.g. side-emitting laser diodes, vertical-cavity surface-emitting laser diodes, SLEDs, or light-emitting diodes, for providing a plurality of light beams. The collimators 1406 may include a concave mirror, a bulk lens, a Fresnel lens, a holographic lens, etc., and may be integrated with the light source subassembly 1402. The scanners 1408 may include the 2D MEMS scanner 208 of FIG. 2A, for example. The function of the pupil replicators 1410 is to provide multiple laterally offset copies of the light beams redirected or scanned by the scanner 1408 at eyeboxes 1412 where the observer's eyes are placed, as has been explained above with reference to FIG. 1.

A controller 1405 (FIG. 14) is operably coupled to the scanners 1408 and the electronic drivers 1404. The controller 1405 may be configured for determining the X- and Y-tilt angles of the tiltable MEMS reflectors of the scanners 1408. Then, the controller 1405 determines which pixel or pixels of the image to be displayed correspond to the determined X- and Y-tilt angles. Then, the controller 1405 determines the brightness and/or color of these pixels, and operates the electronic drivers 1404 accordingly for providing powering electric pulses to the light source subassemblies 1402 to produce light pulses at power level(s) corresponding to the determined pixel brightness and color.

Figure 15:
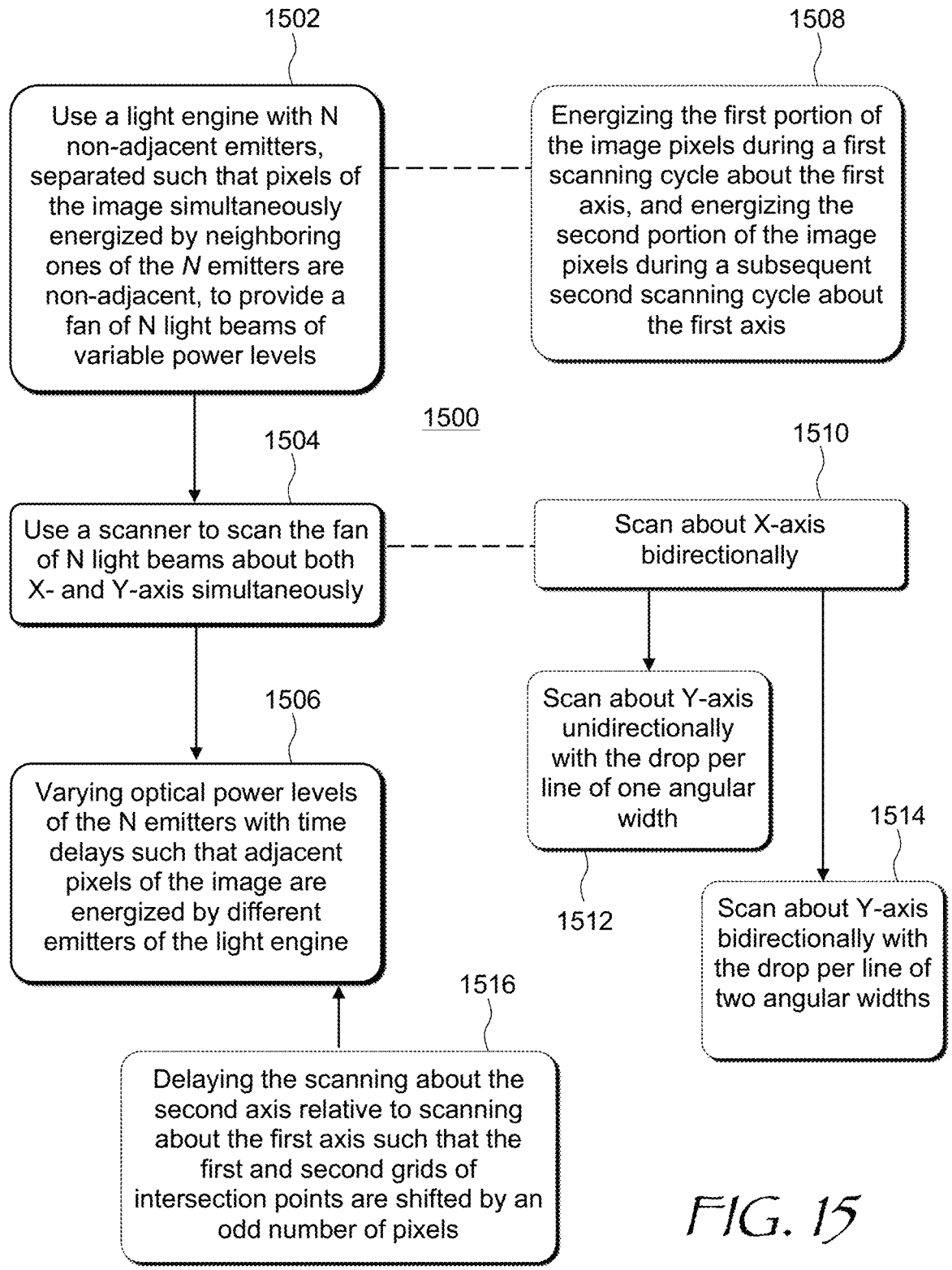
FIG. 15 is a flow chart of a method for providing an image in angular domain.

Referring to FIG. 15, a method 1500 for providing an image in angular domain includes using a light engine with N emitters coupled to a collimator to provide a fan of N light beams (1502) of variable optical power levels. For example, the light engine 202 of the scanning projector display 200 (FIG. 2A) includes three emitters, which are optically coupled to the collimator 250 to provide the collimated light beams 231, 232, and 233. The N emitters (N is an integer >1) are spaced apart from each other such that pixels of the image concurrently energized by neighboring ones of the N emitters are non-adjacent, as illustrated schematically in FIG. 5, where the emitters 511, 512, and 513 are spaced apart from one another such that the corresponding pixels are spaced apart by the spacing 542. In some embodiments, the N emitters are spaced apart from each other such that a spacing between the concurrently energized pixels is Nm+1, where m is an integer.

A scanner is then used to concurrently scan (1504) the fan of the N light beams about first and second non-parallel axes, e.g. Y- and X-axes. Different scanning configurations may be used, including unidirectional, bidirectional, interlaced, etc. scanning as explained above with reference to FIGS. 3 to 6, FIGS. 7A to 7C, FIG. 8, FIGS. 9A to 9D, and FIG. 10 to FIG. 12. In some embodiments, the fan of N light beams is continuously scanned about the Y-axis at a frame rate, e.g. 50 Gz or higher, while being continuously scanned about the X-axis at a line rate higher than the frame rate.

The brightness or optical power levels of the N emitters may be varied (1506) with time delays selected such that adjacent pixels of the image are energized by different ones of the N emitters, as explained above with reference to FIG. 5. Throughout this specification, the terms "brightness" or "optical power level" refer to instantaneous optical power of a continuously variable light source, or an averaged power of a pulsed light source. The latter may be calculated, for example, by dividing pulse energy by a pulse period. One of, or both pulse energy and pulse period may be varied to vary the brightness or optical power level.

In some embodiments, the image may be broken down into several interlaced portions of image pixels, e.g. a first portion interlaced with a second portion. For such embodiments, the beam providing step 1502 may include operating the light engine (1508) to energize the first portion of the image pixels during a first scanning cycle about the first axis, and to energize the second portion of the image pixels during a subsequent second scanning cycle about the first axis.

In some embodiments, the scanner is operated to scan the fan of N light beams about X-axis bidirectionally, while energizing the N emitters during both (e.g. first and second) opposed directions of scanning about the X-axis (1510). For such embodiments, the scanner may be operated for concurrent unidirectional scanning (1512) of the fan of N light beams about the Y-axis, such that the fan of N light beams is scanned about the first axis by one angular width of the fan of N light beams per each bidirectional scan about the X-axis, i.e. with the drop per line of one angular width of the fan of N light beams. As explained above with reference to FIGS. 7A to 7C, this provides for uniform coverage of the field of view upon each unidirectional vertical scanning cycle. Alternatively, the scanner may be operated for bidirectional scanning (1514) of the fan of N light beams about the Y-axis, such that the fan of N light beams is scanned about the Y-axis by two angular widths of the fan of N light beams per each bidirectional scan about the X-axis, i.e. with the drop per line of two angular widths of the fan of N light beams. This provides for uniform coverage of the field of view upon each bidirectional vertical scanning cycle, as illustrated and explained with reference to FIGS. 9A to 9D.

To reduce the effect of brightness modulation grid in the displayed image, the latter may be shifted by an odd number of pixels at every second frame. Specifically, a first image frame may be displayed during a first scanning cycle about the first axis, and a next (second) image frame may be displayed during a next (second) scanning cycle about the first axis. During the first scanning cycle, scanning trajectories of the fan of N light beams corresponding to the first and second directions of the bidirectional scanning intersect one another at a first grid of intersection points. During the second scanning cycle, scanning trajectories of the fan of N light beams corresponding to the first and second directions of the bidirectional scanning intersect one another at a second grid of intersection points. The scanning about X-axis may be delayed (1516) relative to scanning about Y-axis such that the first and second grids of intersection points are offset relative to each other by an odd number of pixels (FIG. 12). The N emitters may be operated with a corresponding time offset to avoid a shift of the second image frame relative to the first image frame due to delaying the scanning about the second axis.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 16A:
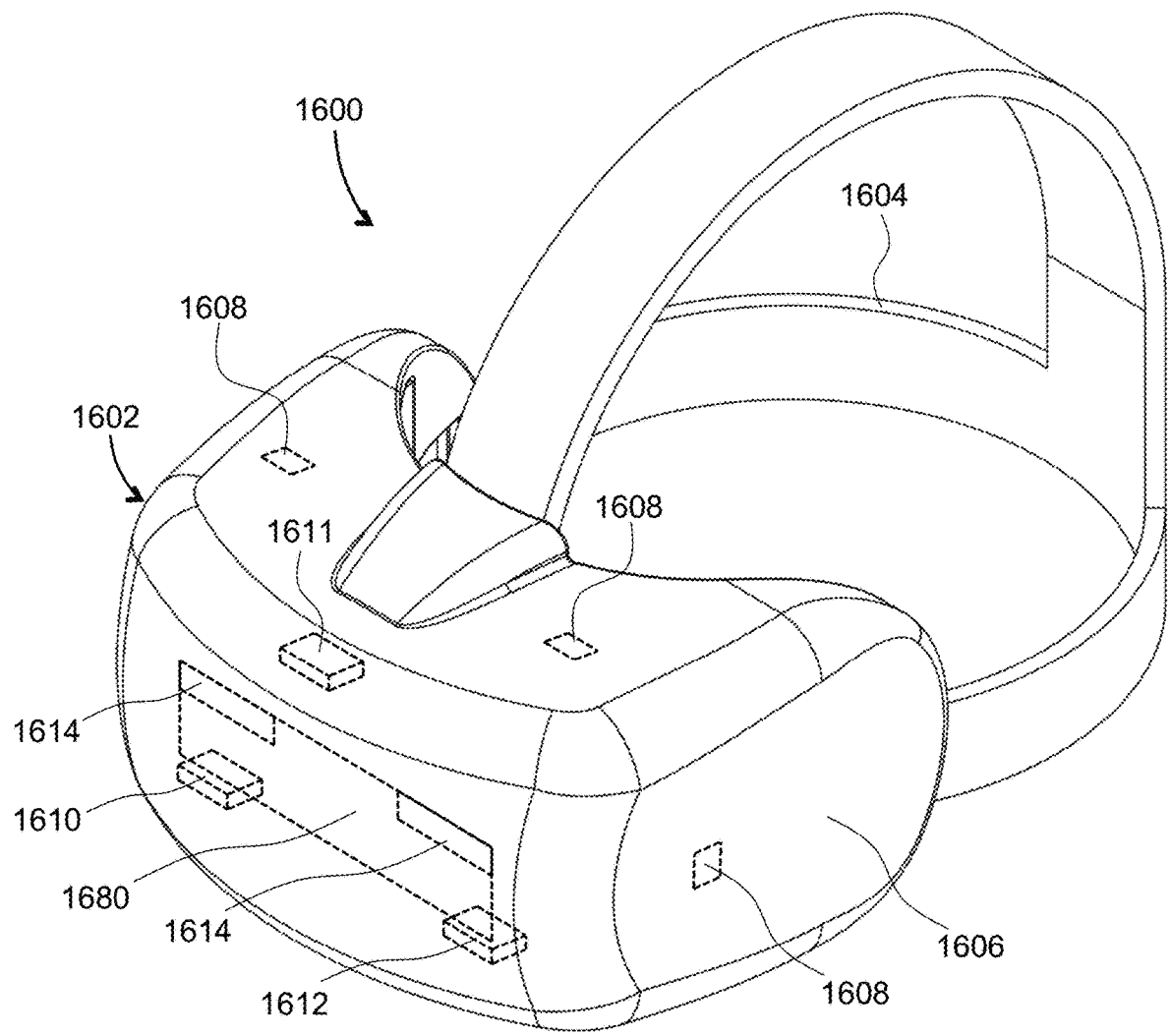
FIG. 16A is an isometric view of a head-mounted display of the present disclosure.

Referring to FIG. 16A, an HMD 1600 is an example of an AR/VR wearable display system which encloses the user's face, for a greater degree of immersion into the AR/VR environment. The function of the HMD 1600 is to augment views of a physical, real-world environment with computer-generated imagery, and/or to generate the entirely virtual 3D imagery. The HMD 1600 may include a front body 1602 and a band 1604. The front body 1602 is configured for placement in front of eyes of a user in a reliable and comfortable manner, and the band 1604 may be stretched to secure the front body 1602 on the user's head. A display system 1680 may be disposed in the front body 1602 for presenting AR/VR imagery to the user. The display system 1680 may include the scanning projector display 100 of FIG. 1, for example. Sides 1606 of the front body 1602 may be opaque or transparent.

In some embodiments, the front body 1602 includes locators 1608 and an inertial measurement unit (IMU) 1610 for tracking acceleration of the HMD 1600, and position sensors 1612 for tracking position of the HMD 1600. The IMU 1610 is an electronic device that generates data indicating a position of the HMD 1600 based on measurement signals received from one or more of position sensors 1612, which generate one or more measurement signals in response to motion of the HMD 1600. Examples of position sensors 1612 include: one or more accelerometers, one or more gyroscopes, one or more magnetometers, another suitable type of sensor that detects motion, a type of sensor used for error correction of the IMU 1610, or some combination thereof. The position sensors 1612 may be located external to the IMU 1610, internal to the IMU 1610, or some combination thereof.

The locators 1608 are traced by an external imaging device of a virtual reality system, such that the virtual reality system can track the location and orientation of the entire HMD 1600. Information generated by the IMU 1610 and the position sensors 1612 may be compared with the position and orientation obtained by tracking the locators 1608, for improved tracking accuracy of position and orientation of the HMD 1600. Accurate position and orientation is important for presenting appropriate virtual scenery to the user as the latter moves and turns in 3D space.

The HMD 1600 may further include a depth camera assembly (DCA) 1611, which captures data describing depth information of a local area surrounding some or all of the HMD 1600. To that end, the DCA 1611 may include a laser radar (LIDAR), or a similar device. The depth information may be compared with the information from the IMU 1610, for better accuracy of determination of position and orientation of the HMD 1600 in 3D space.

The HMD 1600 may further include an eye tracking system 1614 for determining orientation and position of user's eyes in real time. The obtained position and orientation of the eyes also allows the HMD 1600 to determine the gaze direction of the user and to adjust the image generated by the display system 1680 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1602.

Figure 16B:
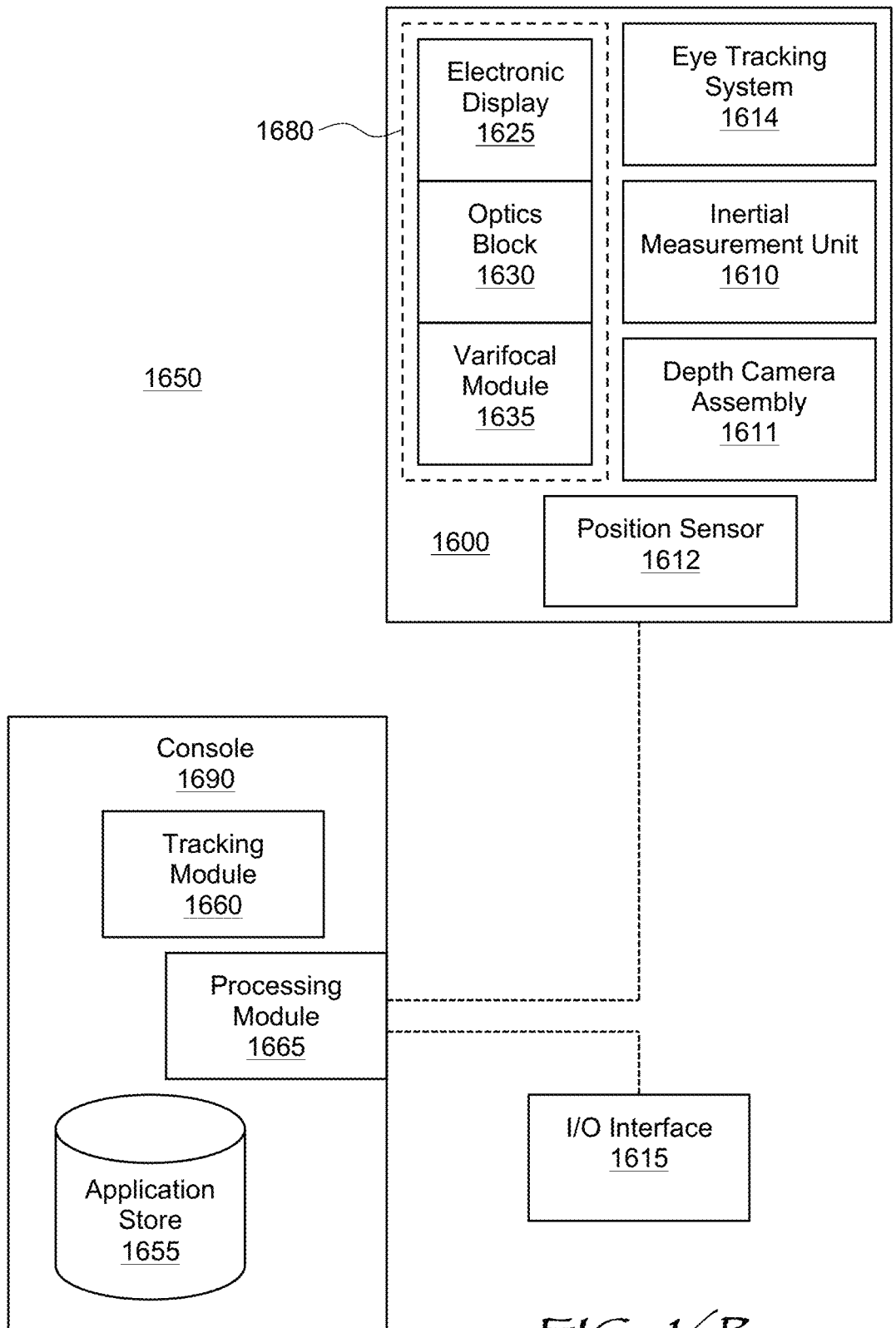
FIG. 16B is a block diagram of a virtual reality system including the headset of FIG. 16A.

Referring to FIG. 16B, an AR/VR system 1650 includes the HMD 1600 of FIG. 16A, an external console 1690 storing various AR/VR applications, setup and calibration procedures, 3D videos, etc., and an input/output (I/O) interface 1615 for operating the console 1690 and/or interacting with the AR/VR environment. The HMD 1600 may be "tethered" to the console 1690 with a physical cable, or connected to the console 1690 via a wireless communication link such as Bluetooth®, Wi-Fi, etc. There may be multiple HMDs 1600, each having an associated I/O interface 1615, with each HMD 1600 and I/O interface(s) 1615 communicating with the console 1690. In alternative configurations, different and/or additional components may be included in the AR/VR system 1650. Additionally, functionality described in conjunction with one or more of the components shown in FIGS. 16A and 16B may be distributed among the components in a different manner than described in conjunction with FIGS. 16A and 16B in some embodiments. For example, some or all of the functionality of the console 1615 may be provided by the HMD 1600, and vice versa. The HMD 1600 may be provided with a processing module capable of achieving such functionality.

As described above with reference to FIG. 16A, the HMD 1600 may include the eye tracking system 1614 (FIG. 16B) for tracking eye position and orientation, determining gaze angle and convergence angle, etc., the IMU 1610 for determining position and orientation of the HMD 1600 in 3D space, the DCA 1611 for capturing the outside environment, the position sensor 1612 for independently determining the position of the HMD 1600, and the display system 1680 for displaying AR/VR content to the user. The display system 1680 includes (FIG. 16B) an electronic display 1625, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1680 further includes an optics block 1630, whose function is to convey the images generated by the electronic display 1625 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1680 may further include a varifocal module 1635, which may be a part of the optics block 1630. The function of the varifocal module 1635 is to adjust the focus of the optics block 1630 e.g. to compensate for vergence-accommodation conflict, to correct for vision defects of a particular user, to offset aberrations of the optics block 1630, etc.

The I/O interface 1615 is a device that allows a user to send action requests and receive responses from the console 1690. An action request is a request to perform a particular action. For example, an action request may be an instruction to start or end capture of image or video data or an instruction to perform a particular action within an application. The I/O interface 1615 may include one or more input devices, such as a keyboard, a mouse, a game controller, or any other suitable device for receiving action requests and communicating the action requests to the console 1690. An action request received by the I/O interface 1615 is communicated to the console 1690, which performs an action corresponding to the action request. In some embodiments, the I/O interface 1615 includes an IMU that captures calibration data indicating an estimated position of the I/O interface 1615 relative to an initial position of the I/O interface 1615. In some embodiments, the I/O interface 1615 may provide haptic feedback to the user in accordance with instructions received from the console 1690. For example, haptic feedback can be provided when an action request is received, or the console 1690 communicates instructions to the I/O interface 1615 causing the I/O interface 1615 to generate haptic feedback when the console 1690 performs an action.

The console 1690 may provide content to the HMD 1600 for processing in accordance with information received from one or more of: the IMU 1610, the DCA 1611, the eye tracking system 1614, and the I/O interface 1615. In the example shown in FIG. 16B, the console 1690 includes an application store 1655, a tracking module 1660, and a processing module 1665. Some embodiments of the console 1690 may have different modules or components than those described in conjunction with FIG. 16B. Similarly, the functions further described below may be distributed among components of the console 1690 in a different manner than described in conjunction with FIGS. 16A and 16B.

The application store 1655 may store one or more applications for execution by the console 1690. An application is a group of instructions that, when executed by a processor, generates content for presentation to the user. Content generated by an application may be in response to inputs received from the user via movement of the HMD 1600 or the I/O interface 1615. Examples of applications include: gaming applications, presentation and conferencing applications, video playback applications, or other suitable applications.

The tracking module 1660 may calibrate the AR/VR system 1650 using one or more calibration parameters and may adjust one or more calibration parameters to reduce error in determination of the position of the HMD 1600 or the I/O interface 1615. Calibration performed by the tracking module 1660 also accounts for information received from the IMU 1610 in the HMD 1600 and/or an IMU included in the I/O interface 1615, if any. Additionally, if tracking of the HMD 1600 is lost, the tracking module 1660 may re-calibrate some or all of the AR/VR system 1650.

The tracking module 1660 may track movements of the HMD 1600 or of the I/O interface 1615, the IMU 1610, or some combination thereof. For example, the tracking module 1660 may determine a position of a reference point of the HMD 1600 in a mapping of a local area based on information from the HMD 1600. The tracking module 1660 may also determine positions of the reference point of the HMD 1600 or a reference point of the I/O interface 1615 using data indicating a position of the HMD 1600 from the IMU 1610 or using data indicating a position of the I/O interface 1615 from an IMU included in the I/O interface 1615, respectively. Furthermore, in some embodiments, the tracking module 1660 may use portions of data indicating a position or the HMD 1600 from the IMU 1610 as well as representations of the local area from the DCA 1611 to predict a future location of the HMD 1600. The tracking module 1660 provides the estimated or predicted future position of the HMD 1600 or the I/O interface 1615 to the processing module 1665.

The processing module 1665 may generate a 3D mapping of the area surrounding some or all of the HMD 1600 ("local area") based on information received from the HMD 1600. In some embodiments, the processing module 1665 determines depth information for the 3D mapping of the local area based on information received from the DCA 1611 that is relevant for techniques used in computing depth. In various embodiments, the processing module 1665 may use the depth information to update a model of the local area and generate content based in part on the updated model.

The processing module 1665 executes applications within the AR/VR system 1650 and receives position information, acceleration information, velocity information, predicted future positions, or some combination thereof, of the HMD 1600 from the tracking module 1660. Based on the received information, the processing module 1665 determines content to provide to the HMD 1600 for presentation to the user. For example, if the received information indicates that the user has looked to the left, the processing module 1665 generates content for the HMD 1600 that mirrors the user's movement in a virtual environment or in an environment augmenting the local area with additional content. Additionally, the processing module 1665 performs an action within an application executing on the console 1690 in response to an action request received from the I/O interface 1615 and provides feedback to the user that the action was performed. The provided feedback may be visual or audible feedback via the HMD 1600 or haptic feedback via the I/O interface 1615.

In some embodiments, based on the eye tracking information (e.g., orientation of the user's eyes) received from the eye tracking system 1614, the processing module 1665 determines resolution of the content provided to the HMD 1600 for presentation to the user on the electronic display 1625. The processing module 1665 may provide the content to the HMD 1600 having a maximum pixel resolution on the electronic display 1625 in a foveal region of the user's gaze. The processing module 1665 may provide a lower pixel resolution in other regions of the electronic display 1625, thus lessening power consumption of the AR/VR system 1650 and saving computing resources of the console 1690 without compromising a visual experience of the user. In some embodiments, the processing module 1665 can further use the eye tracking information to adjust where objects are displayed on the electronic display 1625 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A scanning projector display comprising:
   a light engine comprising N emitters coupled to a collimator for providing a fan of N light beams of variable optical power levels, wherein N>1;
   a scanner configured to receive and angularly scan the fan of N light beams about first and second non-parallel axes to provide an image in angular domain, wherein the N emitters are spaced apart from each other such that pixels of the image concurrently energized by neighboring ones of the N emitters are non-adjacent; and
   a controller operably coupled to the light engine and the scanner and configured to:
      cause the scanner to scan the fan of N light beams about the first axis at a frame rate while scanning the fan of N light beams about the second axis at a line rate higher than the frame rate, wherein the scanning about the first axis is bidirectional; and
      cause the light engine to vary the optical power levels of the N emitters with time delays such that adjacent pixels of the image are energized by different ones of the N emitters.

2. The scanning projector display of claim 1, wherein the N emitters are spaced apart such that a spacing between the concurrently energized pixels is at least one of Nm−1, Nm, or Nm+1 pixels, wherein m is an integer.

3. The scanning projector display of claim 1, wherein the scanner is configured to continuously scan the fan of N light beams about the first axis while continuously scanning the fan of N light beams about the second axis.

4. The scanning projector display of claim 1, wherein the image comprises first and second interlaced portions of image pixels;
   wherein the controller is configured to operate the light engine to energize the first portion of the image pixels during a first scanning cycle about the first axis, and to energize the second portion of the image pixels during a subsequent second scanning cycle about the first axis.

5. The scanning projector display of claim 1, wherein the fan of N light beams has an angular width defined along a direction of scanning about the first axis; and
   wherein the controller is configured to operate the scanner for bidirectional scanning the fan of N light beams about the second axis and for operating the N emitters during first and second opposed directions of the bidirectional scanning about the second axis.

6. The scanning projector display of claim 5, wherein the fan of N light beams is scanned about the first axis by one angular width per each bidirectional scan about the second axis.

7. The scanning projector display of claim 5, wherein the fan of N light beams is scanned about the first axis by two angular widths per each bidirectional scan about the second axis.

8. The scanning projector display of claim 5, wherein the controller is configured to display a first image frame during a first scanning cycle about the first axis, and a next image frame during a next scanning cycle about the first axis;
   wherein, during the first scanning cycle, scanning trajectories of the fan of N light beams corresponding to the first and second directions of the bidirectional scanning intersect one another at a first grid of intersection points;
   wherein, during the next scanning cycle, scanning trajectories of the fan of N light beams corresponding to the first and second directions of the bidirectional scanning intersect one another at a second grid of intersection points; and
   wherein the controller is configured to:
      delay the scanning about the second axis relative to scanning about the first axis such that the first and second grids of intersection points are offset relative to each other by an odd number of pixels; and
      operate the N emitters with a corresponding time offset to avoid a shift of the next image frame relative to the first image frame due to delaying the scanning about the second axis.

9. The scanning projector display of claim 1, wherein the scanner comprises a microelectromechanical system (MEMS) scanner having a reflector tiltable about two non-parallel axes.

10. The scanning projector display of claim 9, wherein in operation, the fan of N light beams is converging at the tiltable reflector of the MEMS scanner.

11. The scanning projector display of claim 1, further comprising a pupil replicator optically coupled to the scanner for providing multiple offset copies of the fan of N light beams.

12. A method for providing an image in angular domain, the method comprising:
   using a light engine comprising N emitters coupled to a collimator to provide a fan of N light beams of variable optical power levels, wherein N>1;
   using a scanner to scan the fan of N light beams about a first axis at a frame rate while scanning the fan of N light beams about a second axis at a line rate higher than the frame rate, wherein the scanning about the first axis is bidirectional, and wherein the N emitters are spaced apart from each other such that pixels of the image concurrently energized by neighboring ones of the N emitters are non-adjacent; and
   varying the optical power levels of the N emitters with time delays selected such that adjacent pixels of the image are energized by different ones of the N emitters.

13. The method of claim 12, wherein the N emitters are spaced apart from each other such that a spacing between the concurrently energized pixels is at least one of Nm−1, Nm, or Nm+1 pixels, wherein m is an integer.

14. The method of claim 12, comprising continuously scanning the fan of N light beams about the first axis while concurrently scanning the fan of N light beams about the second axis.

15. The method of claim 12, wherein the image comprises first and second interlaced portions of image pixels;
   wherein the light engine is operated to energize the first portion of the image pixels during a first scanning cycle about the first axis, and to energize the second portion of the image pixels during a subsequent second scanning cycle about the first axis.

16. The method of claim 12, wherein the fan of N light beams has an angular width defined along a direction of scanning about the first axis;
   wherein the scanner is operated for bidirectional scanning the fan of N light beams about the second axis; and wherein the N emitters are operated during first and second opposed directions of the bidirectional scanning about the second axis.

17. The method of claim 16, wherein the fan of N light beams is scanned about the first axis by one angular width per each bidirectional scan about the second axis.

18. The method of claim 16, wherein the fan of N light beams is scanned about the first axis by two angular widths per each bidirectional scan about the second axis.

19. The method of claim 16, comprising displaying a first image frame during a first scanning cycle about the first axis, and displaying a next image frame during a next scanning cycle about the first axis;

wherein, during the first scanning cycle, scanning trajectories of the fan of N light beams corresponding to the first and second directions of the bidirectional scanning intersect one another at a first grid of intersection points;

wherein, during the next scanning cycle, scanning trajectories of the fan of N light beams corresponding to the first and second directions of the bidirectional scanning intersect one another at a second grid of intersection points; and wherein the scanning about the second axis is delayed relative to scanning about the first axis such that the first and second grids of intersection points are offset relative to each other by an odd number of pixels, wherein the N emitters are operated with a corresponding time offset to avoid a shift of the next image frame relative to the first image frame due to delaying the scanning about the second axis.

20. The method of claim 14, wherein the frame rate is higher than 50 Hz.

* * * * *